Aug. 21, 1951     R. W. CRONSHEY ET AL     2,564,881
TRANSFORMER RECTIFIER
Filed April 14, 1948
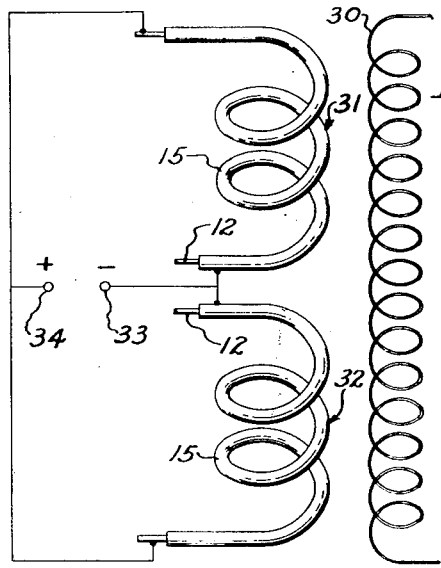
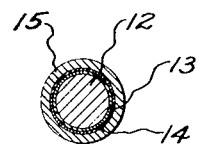
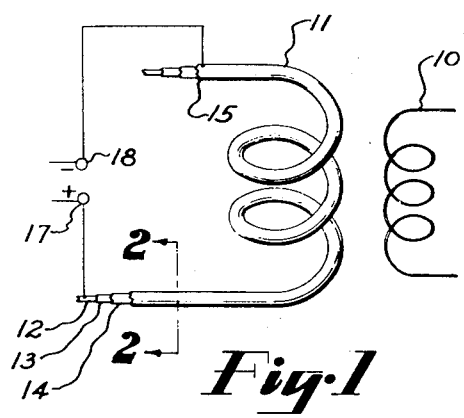
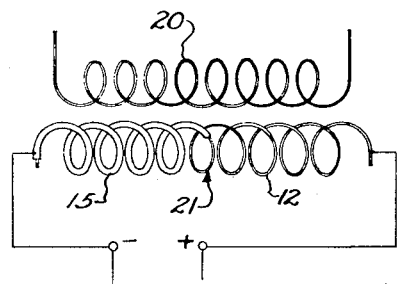
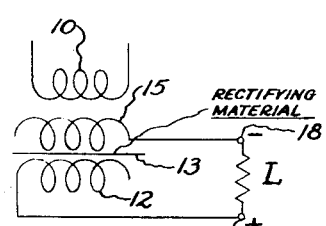
INVENTORS.
RAYMOND W. CRONSHEY
BY WILLIAM H. RICKARDS
*Fay, Golrick & Fay*
ATTORNEYS Patented Aug. 21, 1951

2,564,881

UNITED STATES PATENT OFFICE 2,564,881

TRANSFORMER RECTIFIER

Raymond W. Cronshey and William H. Rickards, Cleveland, Ohio

Application April 14, 1948, Serial No. 20,946

14 Claims. (Cl. 175—366)

1

The present invention relates to a combined transformer and rectifier for converting alternating current of a given voltage to unidirectional current of the same or a different voltage.

An object of this invention is to provide a transformer with a secondary winding which will perform the dual functions of acting as a rectifier while at the same time fulfilling its normal function as a transformer secondary winding.

Heretofore, apparatus for the transformation and rectification of current required the use of two separate devices, namely, a transformer to develop the proper voltage required and a rectifier to control the direction of flow of the transformed current to an external load.

Another object of the invention is to provide a rectifier of the so-called "dry" type which is filamentary in form so that it may be used as the secondary winding of a transformer.

Other objects and advantages of the invention will be apparent from the following description of a preferred form of the invention, reference being made to the accompanying drawings wherein:

Fig. 1 is a diagrammatic illustration of a transformer-rectifier embodying the present invention;

Fig. 2 is a view in section of the secondary winding of the transformer illustrated in Fig. 1, with parts of the section being exaggerated to more clearly illustrate the invention;

Fig. 3 is a diagrammatic showing of the transformer connected with a load;

Fig. 4 is a diagrammatic illustration of a second form of transformer; and

Fig. 5 is a diagrammatic illustration of a full wave transformer-rectifier.

The present invention may be used with any suitable type of transformer such as an iron core type, powdered iron core type or air core type, and in the drawings we have shown, for the purpose of illustration, an air core type transformer. The transformer comprises a primary coil 10 and a secondary winding 11. The primary coil may be of conventional form but the secondary winding consists of a filamentary rectifier element in the form of a winding.

The secondary winding comprises an inner wire 12 formed of any suitable electrical conductor, for example, copper. The wire 12 has a layer of rectifying material 13 thereon, and by "rectifying material" we mean a material which when associated in electrical contact with the metal of the wire will permit current to flow substantially in one direction only to or from the wire, as the case may be. In the present instance the wire 12 is copper and the rectifying material is cuprous oxide. It is well understood in the art that a layer of cuprous oxide on copper will permit passage of electrons substantially in one direction only, namely, from the copper to the cuprous oxide and this fact has been utilized heretofore in providing rectifiers for converting alternating current to direct current. Inner wires of other metal and other rectifying materials could be used, for example, an aluminum wire with a selenium coating, and our invention contemplates the use of any materials suitable for rectification of current.

The cuprous oxide layer 13 is covered with a thin plating of nickel 14 which prevents oxidation of the cuprous oxide and it also provides a good electrical connection between the oxide and a sheath 15 formed of material which is a good conductor of electricity, such as aluminum. Preferably, the cross-sectional area of the inner wire 12 and the outer conductor 15 should be such that the resistance to the passage of current therethrough is substantially equal.

In the form of the transformer shown in Fig. 1 substantially the entire winding 11 consists of the structure just described, that is the inner wire coated with rectifying material and encased in an outer conductor. It will be noted that this structure, in effect, provides two coextensive coils of conducting material separated by a layer of rectifying material. Thus, although the winding 11 is shown as consisting of two coaxial conductors with a layer of rectifying material therebetween it will be understood that the conductors need not necessarily be in coaxial relation, but for example, they could be substantially flat strips separated by rectifying material but the composite or lamellar strip being wound into the form of a coil. The successive turns of the secondary winding are, of course, insulated in any suitable manner.

In connecting the secondary winding with a load the inner wire 12 at one end of the winding is connected to one output terminal 17 while at the opposite end of the winding the outer conductor 15 is connected to output terminal 18. Referring to Fig. 3, it will be appreciated that the two conductors 12 and 15 will have alternating voltage induced therein from the primary but due to the fact that the rectifying material is interposed between the two conductors current will flow through the external load L substantially in one direction only. In the construction shown, the inner wire 12 is positive and the outer conductor negative so that current will flow only from the conductor 15 to the wire 12 while in the external load L current will flow from terminal 17 to terminal 18. Thus, we have provided in one unit a transformer which will produce unidirectional current at the desired voltage.

In another form of our invention, which is shown in Fig. 4, we have illustrated a transformer comprising a primary winding 20 and a secondary winding 21 which may be formed similarly to the winding 11 with the exception that the inner wire, which is indicated by the same reference numeral as used in describing the winding 11, is only partially coated with the rectifying material and an outer conductor 15. This construction is possible where the current induced in the secondary winding can be adequately carried by the rectifying material covering only a part of the inner wire. In this case rectification will occur only in that part of the winding having the rectifying material and outer conductor 15 while no rectification takes place in the remainder of the winding. However, the voltage output will be that of the entire winding.

The rectifiers described thus far are half wave rectifiers, i. e., the output occurs during only one half cycle of the alternating current. Full wave rectification may be provided in one transformer-rectifier by using two secondary windings connected so that they are operative alternately to produce continuous current output. Such transformer-rectifier is shown in Fig. 5 wherein the primary of the transformer is shown at 30 and secondary windings 31 and 32 are provided. These secondary windings are formed similarly to the secondary 11 of the transformer-rectifier shown in Fig. 1, i. e., they have the inner wire 12, rectifying material 13 and outer conductor 15. The coils 31 and 32 are wound in the same direction and the adjacent ends of the outer conductors are connected to a common terminal 33 to form the negative terminal of the output and the outer ends of inner wires 12 are connected to a common terminal 34 to form the positive terminal of the output.

Although we have described but several forms of the invention it is to be understood that other forms might be adopted, all falling within the scope of the claims which follow.

We claim:

1. A transformer having a secondary winding comprising two coextensive contiguous coils of electricity conducting material electrically connected by a layer of rectifying material throughout at least a portion of one of said coils.

2. A transformer of the character defined in claim 1 in which the output terminals of the secondary comprise a lead from one end of one of said coils and a lead from the opposite end of the other of said coextensive contiguous coils.

3. A transformer of the character defined in claim 1 in which one of said coils extends beyond the other of said coils.

4. A rectifying transformer having a secondary coil comprising an inner wire coated with rectifying material thereon and a coating of electricity conducting material surrounding the rectifying material.

5. A rectifier comprising a winding of an inner wire coated with rectifying material and having a sheathing of conductor material over the rectifying material, and a coil for inducing current in said winding when the coil is energized.

6. A rectifying transformer having a secondary winding coil for a transformer comprising a copper wire with cuprous oxide thereon and a coating of an electricity conducting material surrounding the rectifying material.

7. A secondary coil for a transformer comprising a coil of copper wire with cuprous oxide as a rectifying material thereon, and a conducting layer consisting of a thin plate of nickel and a sheath of aluminum successively upon the rectifying material.

8. A rectifier comprising a secondary winding of a copper wire coated with cuprous oxide as a rectifying material and having a sheathing of a conductor material over the rectifying material and copper core; and a primary coil for inducing current in said secondary winding when the coil is energized with an alternating current.

9. A transformer having a secondary winding at least a portion of which includes a structure comprising two co-extensive coils of electrically conducting materials electrically connected along the length thereof by an interposed rectifying material.

10. A transformer having a secondary winding including a wound lamellar structure comprising a conductor, a layer of rectifying material on the said conductor, and a contact conductor on said layer, the electrical ends of the said structure being the end of the first said conductor at one end of the structure and the end of the said contact conductor at the other end of the structure.

11. A transformer having a secondary winding formed of a lamellar structure comprising a conductor, a layer of rectifying material on the said conductor, and a second conductor on the said layer as a contact for said layer, the end of the first said conductor serving as the secondary terminal at one end of the winding, and at the other end of the winding the end of the said second conductor serving as the other secondary terminal.

12. A transformer of the character defined in claim 11, in which the said conductor and the said rectifying material comprise respectively iron and selenium.

13. A full wave rectifier comprising a primary winding, a core therefor, and two secondary windings, each secondary winding comprising a conductor coated with a rectifying material, and a conductor layer on the rectifying material, each secondary winding having its electrical terminals on the said conductor at one end and on the said conductor layer at the opposite end with the respective terminals on the said conductor of the two coils being of opposite polarity, one output lead of the rectifier connected to the terminal of the said conductor of each winding, and another output lead connected to the terminal of the said conductor layer of each winding.

14. A transformer having a secondary winding formed of a lamellar structure comprising a metal strip of helical form, a layer of rectifying material on the said conductor, and a second conductor on the said layer as a contact for said layer, the end of the first said conductor serving as the secondary terminal at one end of the winding, and at the other end of the winding the end of said second conductor serving as the other secondary terminal.

RAYMOND W. CRONSHEY.
WILLIAM H. RICKARDS.

REFERENCES CITED

The following references are of record in the file of this patent:

UNITED STATES PATENTS

| Number | Name | Date |
|---|---|---|
| 2,046,686 | Kannenberg | July 7, 1936 |
| 2,468,051 | Escoffery | Apr. 26, 1949 |

FOREIGN PATENTS

| Number | Country | Date |
|---|---|---|
| 146,786 | Great Britain | July 15, 1920 |